(12) United States Patent
Baker

(10) Patent No.: US 7,444,374 B1
(45) Date of Patent: Oct. 28, 2008

(54) ELECTRONIC MAIL SOFTWARE WITH MODULAR INTEGRATED AUTHORING/READING SOFTWARE COMPONENTS INCLUDING METHODS AND APPARATUS FOR CONTROLLING THE INTERACTIVITY BETWEEN MAIL AUTHORS AND RECIPIENTS

(76) Inventor: Michelle Baker, 325 Riverside Dr., Apt. #123, New York, NY (US) 10025

( * ) Notice: Subject to any disclaimer, the term of this patent is extended or adjusted under 35 U.S.C. 154(b) by 1680 days.

(21) Appl. No.: 09/604,428

(22) Filed: Jun. 27, 2000

Related U.S. Application Data

(63) Continuation-in-part of application No. 09/209,162, filed on Dec. 10, 1998, and a continuation-in-part of application No. 09/604,426, filed on Jun. 27, 2000.

(51) Int. Cl.
*G06F 15/16* (2006.01)
(52) U.S. Cl. .................................. 709/206; 709/246
(58) Field of Classification Search ................. 709/200, 709/204, 206, 207, 202, 232, 245, 231, 217, 709/203, 224, 246, 227; 707/104, 502, 9, 707/7; 358/402; 345/311; 379/102, 433; 455/575; 715/513, 752, 760, 733, 526; 713/201; 705/27, 42, 37, 1, 9; 434/323; 370/490; 714/4; 726/17
See application file for complete search history.

(56) References Cited

U.S. PATENT DOCUMENTS

| | | | |
|---|---|---|---|
| 5,117,352 A * | 5/1992 | Falek ............................. 714/4 |
| 5,117,354 A | 5/1992 | Long et al. .................. 364/401 |
| 5,319,543 A * | 6/1994 | Wilhelm ........................ 705/3 |
| 5,333,152 A * | 7/1994 | Wilber .................. 379/102.04 |
| 5,452,289 A | 9/1995 | Sharma et al. ............. 370/32.1 |
| 5,481,698 A * | 1/1996 | Itoh et al. ...................... 714/48 |
| 5,508,817 A | 4/1996 | Kunigami ................... 358/402 |
| 5,513,126 A * | 4/1996 | Harkins et al. .............. 709/228 |
| 5,537,543 A * | 7/1996 | Itoh et al. ...................... 714/48 |
| 5,613,012 A * | 3/1997 | Hoffman et al. ............ 382/115 |
| 5,706,434 A | 1/1998 | Kremen et al. ......... 395/200.09 |

(Continued)

OTHER PUBLICATIONS

MIME Tools, Eryq, www.unb.ca/csd/documentation/perl/mime/tools.pm.html, Jan. 1998.*

(Continued)

*Primary Examiner*—Thong Vu
(74) *Attorney, Agent, or Firm*—Gordon & Jacobson, P.C.

(57) ABSTRACT

Electronic mail software includes a main email component and a number of installable components which communicate bidirectionally with the email component through an application programming interface (API). The installable components include authoring/reading components and a mailbox browser/editor component. The main email component provides an underlying graphical user interface (GUI) for functions directly associated with the storage and transfer of electronic mail messages and also handles all data bundling and unbundling that may be required to transform a message created by an authoring component into a fully MIME compliant message. In addition, the main email component includes "hooks" (an application programming interface or API) for the attachment of the installable components. The authoring/reading components each provide functionality particular to the type of document the component is designed to create/display. Some modular components, or messages created by them, have assigned "roles" whereby senders and recipients of certain email documents are provided different kinds of access to the documents.

21 Claims, 11 Drawing Sheets

U.S. PATENT DOCUMENTS

| | | | | |
|---|---|---|---|---|
| 5,710,883 | A | | 1/1998 | Hong et al. ............ 395/200.17 |
| 5,734,901 | A | | 3/1998 | Sidhu et al. ................. 395/680 |
| 5,752,059 | A | * | 5/1998 | Holleran et al. ............ 709/245 |
| 5,790,789 | A | * | 8/1998 | Suarez ....................... 709/202 |
| 5,793,497 | A | | 8/1998 | Funk ........................... 358/402 |
| 5,799,151 | A | * | 8/1998 | HOffer ....................... 709/204 |
| 5,805,811 | A | | 9/1998 | Pratt et al. ............. 395/200.36 |
| 5,809,512 | A | * | 9/1998 | Kato ........................... 707/502 |
| 5,818,447 | A | | 10/1998 | Wolf et al. .................. 345/335 |
| 5,826,062 | A | | 10/1998 | Fake, Jr. ..................... 395/500 |
| 5,826,269 | A | | 10/1998 | Hussey ........................ 707/10 |
| 5,835,769 | A | | 11/1998 | Jervis et al. ................. 395/701 |
| 5,850,219 | A | * | 12/1998 | Kumomura ................ 345/311 |
| 5,860,068 | A | | 1/1999 | Cook ........................... 705/26 |
| 5,867,281 | A | | 2/1999 | Nozoe et al. ................ 258/402 |
| 5,870,548 | A | * | 2/1999 | Nielsen ...................... 709/206 |
| 5,874,953 | A | * | 2/1999 | Webster et al. ............. 715/733 |
| 5,889,518 | A | | 3/1999 | Poreh et al. ................. 345/340 |
| 5,890,139 | A | | 3/1999 | Suzuki et al. ................. 705/27 |
| 5,906,656 | A | | 5/1999 | Keller et al. ................ 709/200 |
| 5,917,489 | A | | 6/1999 | Thurlow ..................... 345/347 |
| 5,923,845 | A | * | 7/1999 | Kamiya et al. ............. 709/206 |
| 5,949,413 | A | * | 9/1999 | Lerissa et al. ............... 715/733 |
| 5,956,486 | A | | 9/1999 | Hickman et al. ....... 395/200.36 |
| 5,960,403 | A | * | 9/1999 | Brown ........................... 705/2 |
| 5,974,449 | A | | 10/1999 | Chang et al. ................ 709/206 |
| 5,995,756 | A | | 11/1999 | Hermann ..................... 395/712 |
| 6,006,117 | A | * | 12/1999 | Hageltorn et al. ........ 455/575.7 |
| 6,014,688 | A | | 1/2000 | Venkatraman .............. 709/206 |
| 6,016,478 | A | * | 1/2000 | Zhang et al. ................... 705/9 |
| 6,023,345 | A | * | 2/2000 | Bloomfield ................ 358/402 |
| 6,052,514 | A | * | 4/2000 | Gill et al. .................... 715/733 |
| 6,085,244 | A | * | 7/2000 | Wookey ..................... 709/224 |
| 6,088,696 | A | | 7/2000 | Moon ........................... 707/10 |
| 6,092,114 | A | * | 7/2000 | Shaffer et al. ............... 709/232 |
| 6,160,631 | A | * | 12/2000 | Okimoto et al. ........... 358/1.15 |
| 6,173,404 | B1 | * | 1/2001 | Colburn et al. ................ 726/17 |
| 6,189,026 | B1 | | 2/2001 | Birrell ........................ 709/206 |
| 6,205,432 | B1 | | 3/2001 | Gabbard ....................... 705/14 |
| 6,230,188 | B1 | * | 5/2001 | Marcus ....................... 709/206 |
| 6,249,807 | B1 | | 6/2001 | Shaw ......................... 709/206 |
| 6,250,930 | B1 | * | 6/2001 | Mintz ......................... 434/323 |
| 6,275,850 | B1 | * | 8/2001 | Beyda et al. ................. 709/206 |
| 6,297,819 | B1 | * | 10/2001 | Furst .......................... 715/733 |
| 6,301,621 | B1 | * | 10/2001 | Haverstock et al. ......... 709/246 |
| 6,317,795 | B1 | * | 11/2001 | Malkin et al. ............... 709/246 |
| 6,332,024 | B1 | * | 12/2001 | Inoue et al. ............ 379/433.06 |
| 6,484,196 | B1 | * | 11/2002 | Maurille ..................... 709/206 |
| 6,519,630 | B1 | * | 2/2003 | Hanawa ...................... 709/206 |
| 6,546,417 | B1 | * | 4/2003 | Baker ......................... 709/206 |
| 6,631,375 | B2 | * | 10/2003 | Jecha et al. ..................... 707/9 |
| 6,665,687 | B1 | * | 12/2003 | Burke ...................... 707/104.1 |
| 6,757,710 | B2 | * | 6/2004 | Reed .......................... 709/203 |
| 6,816,904 | B1 | * | 11/2004 | Ludwig et al. .............. 709/226 |
| 7,076,730 | B1 | * | 7/2006 | Baker ......................... 715/526 |
| 2001/0013004 | A1 | * | 8/2001 | Haris et al. ..................... 705/1 |
| 2002/0087628 | A1 | * | 7/2002 | Rouse et al. ................ 709/203 |
| 2004/0260779 | A1 | * | 12/2004 | Sheffield et al. ............ 709/206 |
| 2005/0075964 | A1 | * | 4/2005 | Quinn et al. ................... 705/37 |

OTHER PUBLICATIONS

Electronic Shopping, Lohse et al, Jul. 1998, Communication of the ACM.*

MicroSoft Outlook 98 for Windows and Windows NT, 1997, p. 189.*

"Eudora extended message Services API Version 3", Lundblade and Blumin, QUALCOMM Incorporated, 1996.

"Surf Monkey -Email",:web site: at http:// www.surfmonkey.com/quick_tour/qt_email.html, 1998.

"Sony Post Pet", at website: http://www.sony.com.sg/postpet/ 1998.

"Guide to Software for Email Correspondence Chess" by John H. Mongle, Feb. 1, 1998, at website:http:/www.chessmail.com/mongle.htm.

Internet site from iT Knowledge.Com, selections of chapters relating to Outlook Express Mail from "Internet Explorer 4 6-In-1" by Hemming, MacMillan Computer Publishing, Part III, 18 pages, downloaded from the Internet, Feb. 25, 2000.

Internet site from iT Knowledge.Com, selections of chapters relating to Netscape Messenger from "Netscape Communicator 6-in-1" by Guilford, MacMillan Computer Publishing, Part III, 12 pages, downloaded from the Internet, Feb. 25, 2000.

"Creating a Template", a website at iT Knowledge.Com, 5 pages downloaded from the Internet Sep. 19, 2000.

* cited by examiner

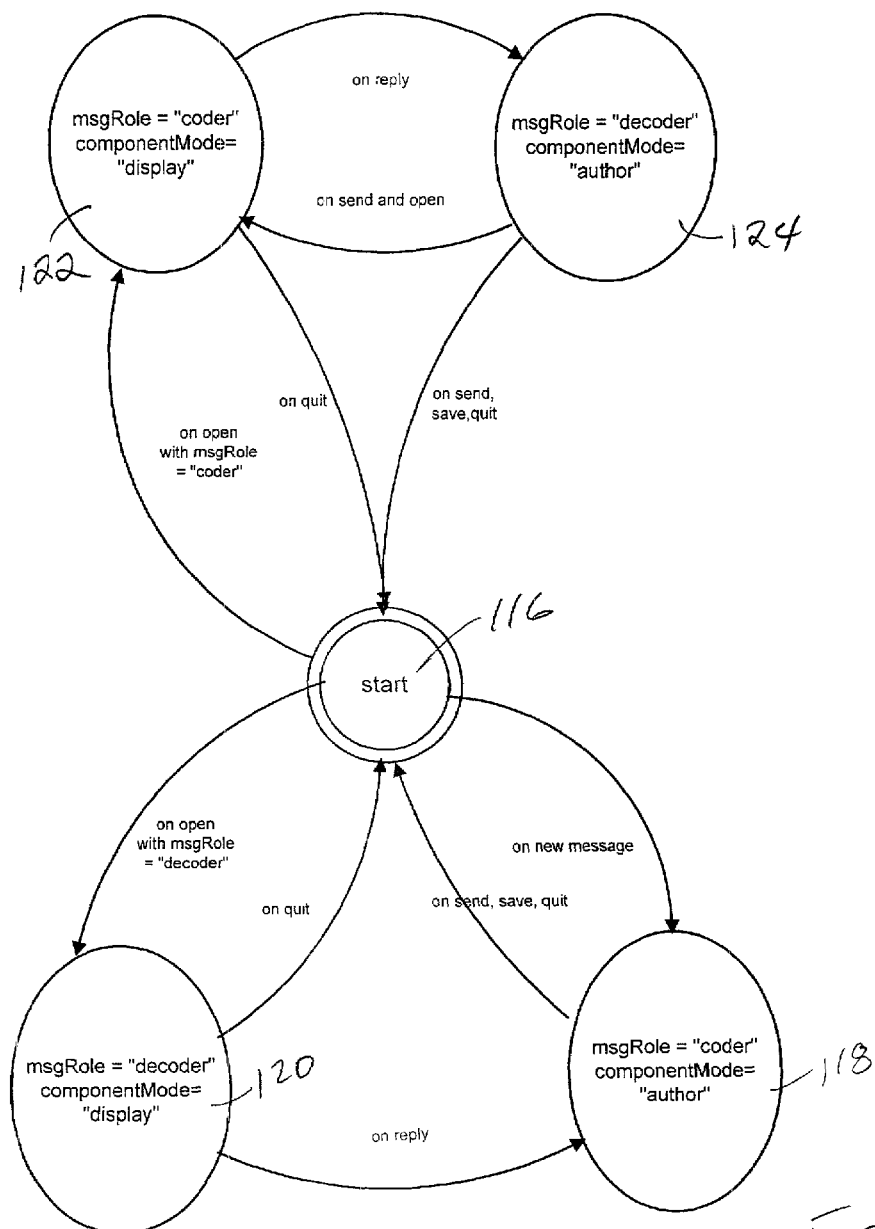

ELECTRONIC MAIL SOFTWARE WITH MODULAR INTEGRATED AUTHORING/READING SOFTWARE COMPONENTS INCLUDING METHODS AND APPARATUS FOR CONTROLLING THE INTERACTIVITY BETWEEN MAIL AUTHORS AND RECIPIENTS

This application is a continuation-in-part of application Ser. No. 09/209,162 filed Dec. 10, 1998, and Ser. No. 09/604,426 filed Jun. 27, 2000 the complete disclosures of which are hereby incorporated by reference herein.

This invention was made with Government support under SBIR Grants Nos. 9561725 and 9710619 awarded by the National Science Foundation. The Government has certain rights in this invention.

BACKGROUND OF THE INVENTION

1. Field of the Invention

The invention relates to an electronic mail program. More particularly, the invention relates to an electronic mail program having modular integral authoring/reading applications whereby documents created with the modular integral authoring/reading applications are seamlessly sent and received by the mail program and which provides different kinds of interactivity with and different kinds of access to electronic mail messages depending on user types or roles.

2. State of the Art

In recent years electronic mail ("email") has become widely used in business, education, and in personal communications. One of the features of electronic mail which is most convenient, particularly in business and in education, is the ability to attach a binary computer file to an email message. This feature enables email correspondents to rapidly share word processing documents, database documents, spreadsheet documents, multimedia documents, or virtually any kind of binary file created by a computer. There are, however, some serious limitations and inconveniences associated with attaching a binary file to an email message.

The original Internet mail system as defined in 1982 with RFC (Request for Comments) 821 and 822 had a number of important limitations. In particular, the system was not designed to carry large quantities of arbitrary data in an email message. In fact, the 1982 SMTP (Simple Mail Transport Protocol) standard required that an email message consist of a single message containing only ASCII characters in lines of 1000 characters (blocks of 32k) or less. Moreover, some implementations of SMTP or other mail transport systems (such as UUCP) restricted message lengths to some allowed maximum number of bytes. Lengthy messages passing through a mail gateway using one of these implementations were likely to be truncated.

The ability to send large quantities of binary data through the Internet electronic mail system was made possible with the MIME (Multipurpose Internet Mail Extensions) standard for Internet messages. The original MIME standard was published as an Internet Request For Comments document (RFC. 1341) and approved in June of 1992. (See Internet RFCs 2045, 2046, and 2047 for the latest MIME standards documents.) The MIME standard describes how an email message should be formatted in order to be considered MIME compliant. MIME defines a set of message header fields and a set of message encoding standards that are designed to overcome the limitations of RFC 822 message formats and still be transportable through any of the numerous legacy mail transport systems in use on the Internet. MIME message header fields extend those defined in RFC 822 and describe the content and encoding type of the email message. Encoding schemes allowed in the MIME standard include "quoted-printable", and "base64". In addition, three unencoded data types are allowed. These are labeled "8 bit", "7 bit", or "binary".

If the sender and the receiver of the email message with the attached binary file are using the same brand and version of email program and both programs are configured in substantially the same way, the receiver's email program should automatically apply the appropriate decoding to the attached binary file and produce a file which is identical to the file which was attached to the email by the sender. However, if the sender and receiver are using different email programs, the recipient may receive a file which must be decoded by the recipient using a separate decoding program.

Even after the file is properly received and decoded, it is often difficult for the receiver of the file to open the file. The receiver of the file might expect that "clicking" on the file icon will open the file. However, clicking on the file icon will often not open the file. It may result in an error message like "application not found" or, worse, it may result in the file being opened by an inappropriate application thereby displaying "gibberish". The receiver of the file must have a program capable of reading (opening) the file. For example, if one attaches a spreadsheet file to an email message, the receiver of the file must have a spreadsheet program in order to open the file. Technically, it is not necessary that the receiver of the file have the same brand program as that which created the file. However, opening a file with a program which did not create it, though possible, can be very inconvenient. The receiver of the file must know what kind of file is attached to the email message, must know what program on their computer is capable of reading that type of file, must launch the program, must open the file from within the program, and wait while the program translates the file.

The limitations of Internet electronic mail can become even more frustrating if the sender and recipient are not using the same operating system (OS). Some mail attachment encoding schemes (and file compression schemes) are OS-dependent and it is possible that an email recipient could receive a file which is impossible to decode (or decompress).

These limitations in electronic mail have discouraged many people, particularly non-sophisticated computer users, from attaching files to electronic mail messages. In fact, for some novice users, the task of launching one application to create a document, saving the document, launching a separate email application to create an email message, and then locating the saved document for attachment to an email message is daunting enough to discourage them. In addition, novice users often complain that after "downloading" a file attached to an email message they cannot find the file on their hard disk.

Another interesting aspect of electronic mail is that it is now widely used in electronic commerce, but only in a very limited way. Electronic mail is used by vendors to advertise goods and such electronic mail may typically include a hyperlink which, if clicked on, will cause the mail recipient's computer to launch a web browser and connect to the vendor's website where the goods may be purchased. Electronic mail is also used by online vendors to provide customer support by answering questions sent to the vendor via electronic mail and to confirm online purchases by sending electronic mail to the purchaser.

My previously incorporated parent application discloses electronic mail software which includes a main email component and a number of installable components. The installable components include authoring/reading components for creating/reading different kinds of documents and mailbox components for listing different kinds of messages or for listing messages in different styles. The main email component provides an underlying graphical user interface for functions directly associated with the storage and transfer of electronic mail messages, and also handles all data bundling and unbundling required to transform a message created by an authoring component into a MIME compliant message. The authoring/reading components act like applications embedded within the email program and allow specific types of documents such as spreadsheets, graphics, databases, etc. to be created from within the email program and emailed directly. The authoring/reading components also allow received documents to be read without the difficulties traditionally associated with attaching binary files to an email letter. The authoring components of the invention pass data to the main email component which packages the data as a MIME compliant message. When the message is received, the main email component concatenates (as needed) and decodes the MIME message and sends the data to the authoring/reading component associated with the MIME type. The electronic mail software also includes modular integrated authoring/reading software wherein the functionality of the authoring/reading software is controlled by the "role" of the user when participating in an exchange of messages. One example of "roles" given in the parent application was that of teacher and student. Another example was that of a puzzle encoder and a puzzle decoder.

It is believed that the enhanced electronic mail software disclosed in my previously incorporated parent application may be even further enhanced to provide more functionality regarding the use of "roles" in the contexts of electronic commerce, healthcare, business, and law, as well as in education.

Recently, the email client OUTLOOK by MICROSOFT has received much attention because of its ability to execute Visual Basic Scripts (VBS) attached to or embedded in the body of an email message. While this ability has the potential of achieving some of the goals of the present invention, it has one major disadvantage. The recent interest in MICROSOFT OUTLOOK and VBS was spurred by the outbreak of several extremely damaging "viruses" or "worms". These Visual Basic Scripts attached to email destroyed files on the email recipient's hard drive and spread by sending copies to all of the email addresses in the recipients' address books. At the present time, the only sure way to prevent damage by malicious Visual Basic Scripts is to alter the "preferences" of OUTLOOK so that the ability to execute Visual Basic Scripts is disabled.

SUMMARY OF THE INVENTION

It is therefore an object of the invention to provide an electronic mail program which includes integrated authoring/reading software whereby different kinds of documents may be created, sent, received, and opened by electronic mail in a seamless manner.

It is another object of the invention to provide an electronic mail program which includes modular integrated authoring/reading software whereby different kinds of documents may be created and sent by email in a seamless manner.

It is a further object of the invention to provide an electronic mail program which includes modular integrated authoring/reading software wherein the functionality of the authoring/reading software is controlled by the "role" of the user when participating in an exchange of messages.

It is an additional object of the invention to provide an electronic mail program which includes modular integrated authoring/reading software whereby the role of the user includes such roles as customer, vendor, database, service provider, technical support, teacher, student, attorney, client, doctor, patient, and organization members having different security clearances.

It is another object of the invention to provide an electronic mail program whereby the role of the message recipient is automatically generated by the authoring/reading component and encoded in the outgoing message.

It is still another object of the invention to provide an electronic mail program which includes installable authoring/reading components which communicate with the email program through a bidirectional application programming interface (API).

In accord with these objects which will be discussed in detail below, the electronic mail software according to one embodiment of the present invention includes a main email component and a number of installable components which communicate bidirectionally with the email component through an application programming interface (API). The installable components include authoring/reading components as well as at least one mailbox browser/editor component. The main email component provides an underlying graphical user interface (GUI) for functions directly associated with the storage and transfer of electronic mail messages. In particular, the main email component provides menu items which allow the user to SEND, READ, REPLY, FORWARD, DELETE, SAVE, and PRINT, for example. The main email program also handles all data bundling and unbundling that may be required to transform a message created by an authoring component into a fully MIME compliant message. In addition, the main email component includes "hooks" (an application programming interface or API) for the attachment of the installable components. The authoring/reading components each provide functionality which is particular to the type of document the component is designed to create/display.

According to the invention, some modular components have assigned "roles" whereby senders and recipients of certain email documents are provided different kinds of access to the documents. For example, in the case of customer/vendor components, the vendor component allows a vendor to create an order form which appears in an email message read by the customer. The customer component allows the customer to fill in the form and mail back the filled-in data to the vendor or the vendor's database. A database component automatically reads the order data from the customer email and transfers this data to billing and fulfillment software. Other modular components having assigned roles include bidder/auctioneer, doctor/patient, attorney/client, etc.

The authoring/reading components interface with the main email component via designated "MIME types". The MIME data standard allows developers to define MIME types using the label "x-"<string> in the data header where <string> is any ASCII string excluding space, control characters and other special characters. The MIME data standard also allows developers to define MIME subtypes using an extension to the label that appends the character "/" and a string to the MIME type. For example a Kidcode Rebus message might be identified with the content-type header set as "Content-Type: x-KidCode/Rebus". Further, the MIME standard allows developers to include parameters within the contents of the "Content-Type" header field. For example, the KidCode Rebus message might be associated with a particular feature such as the school grade level associated with this type of Rebus message, e.g. "Content-Type: x-KidCode/Rebus grade=1". The authoring components of the invention pass data to the main email component which packages the data as a MIME compliant message with the label "x-"<application> in the message header, where <application> identifies the authoring/reading component which created or can display the message. When the message is received, the main email component concatenates and decodes the MIME message, reads the MIME type, sends the data to the component associated with the MIME type, and waits for a user event or a callback from the component. This bidirectional communication between the main email component and the authoring/reading components provides a totally seamless operation wherein the user may send and receive complex documents without any knowledge of attaching files, downloading, decoding, etc. Moreover, enhanced functionality is achieved through installable components. Only after the appropriate component has been installed can an "active" email message call upon the component to execute.

Additional objects and advantages of the invention will become apparent to those skilled in the art upon reference to the detailed description taken in conjunction with the provided figures.

BRIEF DESCRIPTION OF THE DRAWINGS

FIG. 10 is a state diagram illustrating the changes in role in an authoring/reading component.

DETAILED DESCRIPTION OF THE PREFERRED EMBODIMENTS

Figure 1:
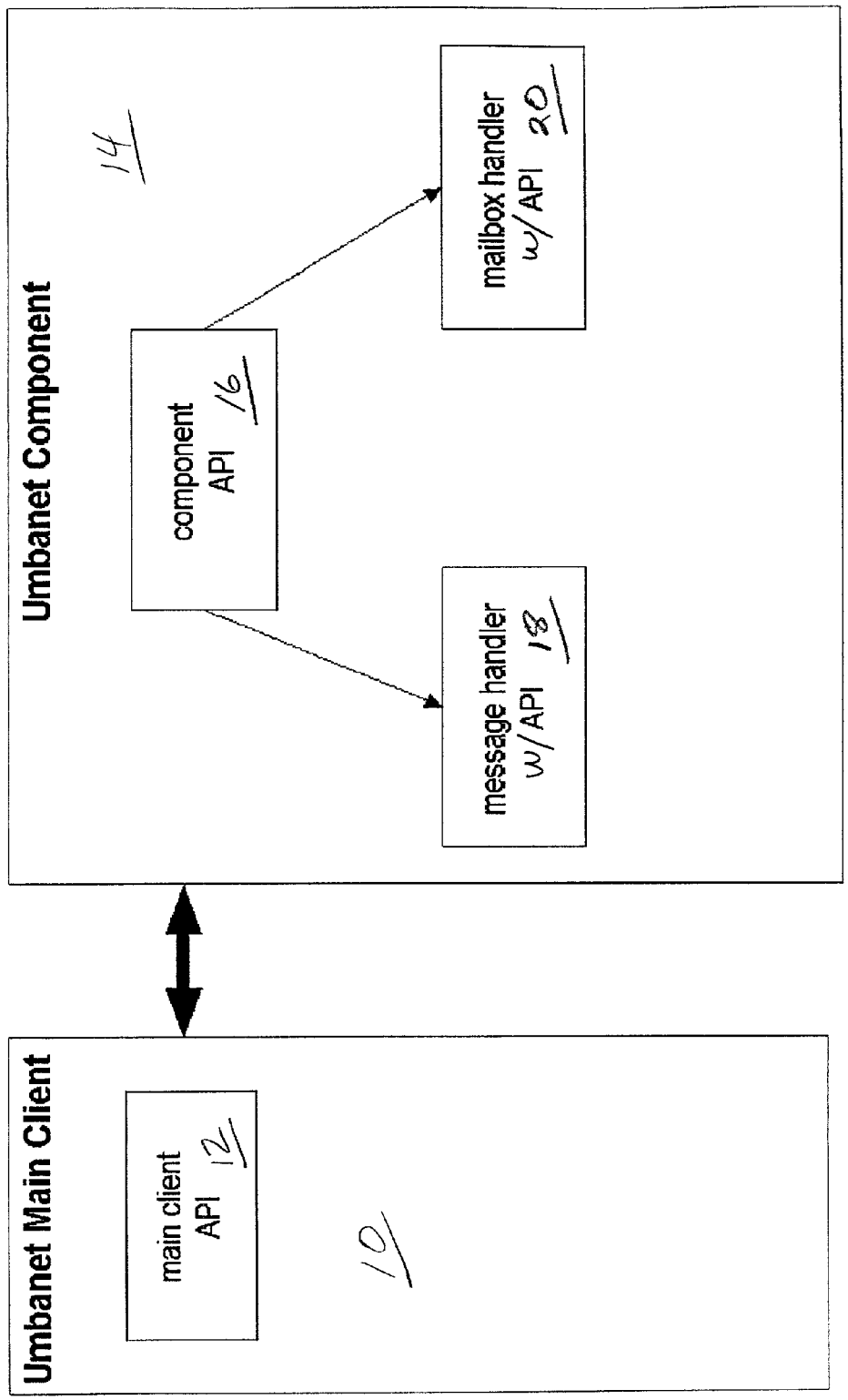
FIG. 1 is a very high level schematic diagram of the architecture of the email software of the invention.

An exemplary embodiment of the architecture of the invention is described as follows with reference to an email client which will be distributed under the brand name UMBANET. Referring now to FIG. 1, the email client includes a main client 10, having a main client API 12, and one or more authoring/reading components 14, each having a component API 16. As described in the previously incorporated parent applications, the authoring/reading components each include a message handler 18 having an API and preferably an installable mailbox handler 20 having an API. Moreover, as described below with reference to FIG. 2, installable components may be made up of either message handlers, mailbox handlers, or both.

Figure 2:
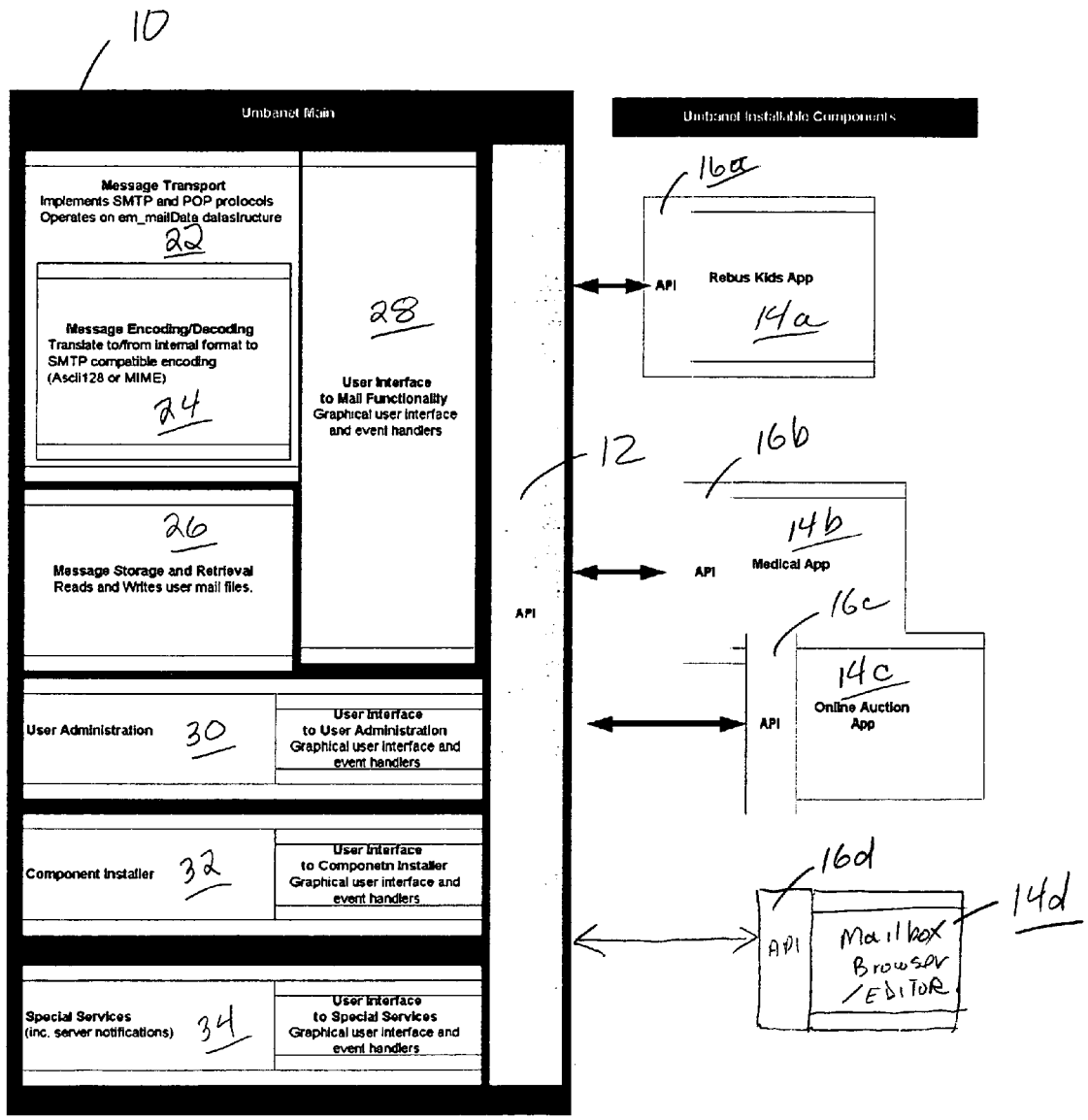
FIG. 2 is a somewhat lower level schematic diagram of the architecture of the email software of the invention.

Referring now to FIG. 2, the main email client 10 includes functionality for message transport 22, message encoding/decoding 24, message storage and retrieval 26, basic GUI to mail services 28, user administration 30, component installation 32, and special services 34. As mentioned above, the main email client 10 also includes an API 12 for communicating with authoring/reading components 14a, 14b, 14c, each of which have an API 16a, 16b, 16c for communicating with the main email client 10. In addition, as mentioned above, a separate installable mailbox browser/editor 14d may be provided, having its own API 16d for communication with the API 12 of the main email client 10. An example of a specialized mailbox browser/editor component is disclosed in previously incorporated parent application Ser. No. 09/604,426.

The main email client 10 performs all of the usual functions of an electronic mail client. These include message transport, message storage and retrieval, message encoding and decoding, user administration (including user preferences). In addition, the main email client includes unique functionality required to enable installable components and special server-based services.

The message transport functionality 22 of the main email client 10 handles all functions traditionally associated with sending (SMTP) and receiving (POP, IMAP) email messages. This includes finding and verifying network addresses, and sending and receiving mail messages to other servers on a network.

The main email client 10 handles all data bundling and unbundling that may be required to transform the message data used by a message authoring component into a fully MIME compliant message type via the message encoding/decoding module 24. This way each message authoring component handles data in a format most convenient to it and all MIME parsing and details associated with protocol compliance are centralized in the main email client 10. The only requirement for the message data passed between a message authoring/reading component and the main email client is that the message body data be formatted either as an ASCII string or in a binhex format.

The main mail client 10 maintains its user mailbox files locally. The storage and retrieval module 26 implements all functionality required for reading and writing messages and mailboxes to/from permanent storage.

Figure 6:
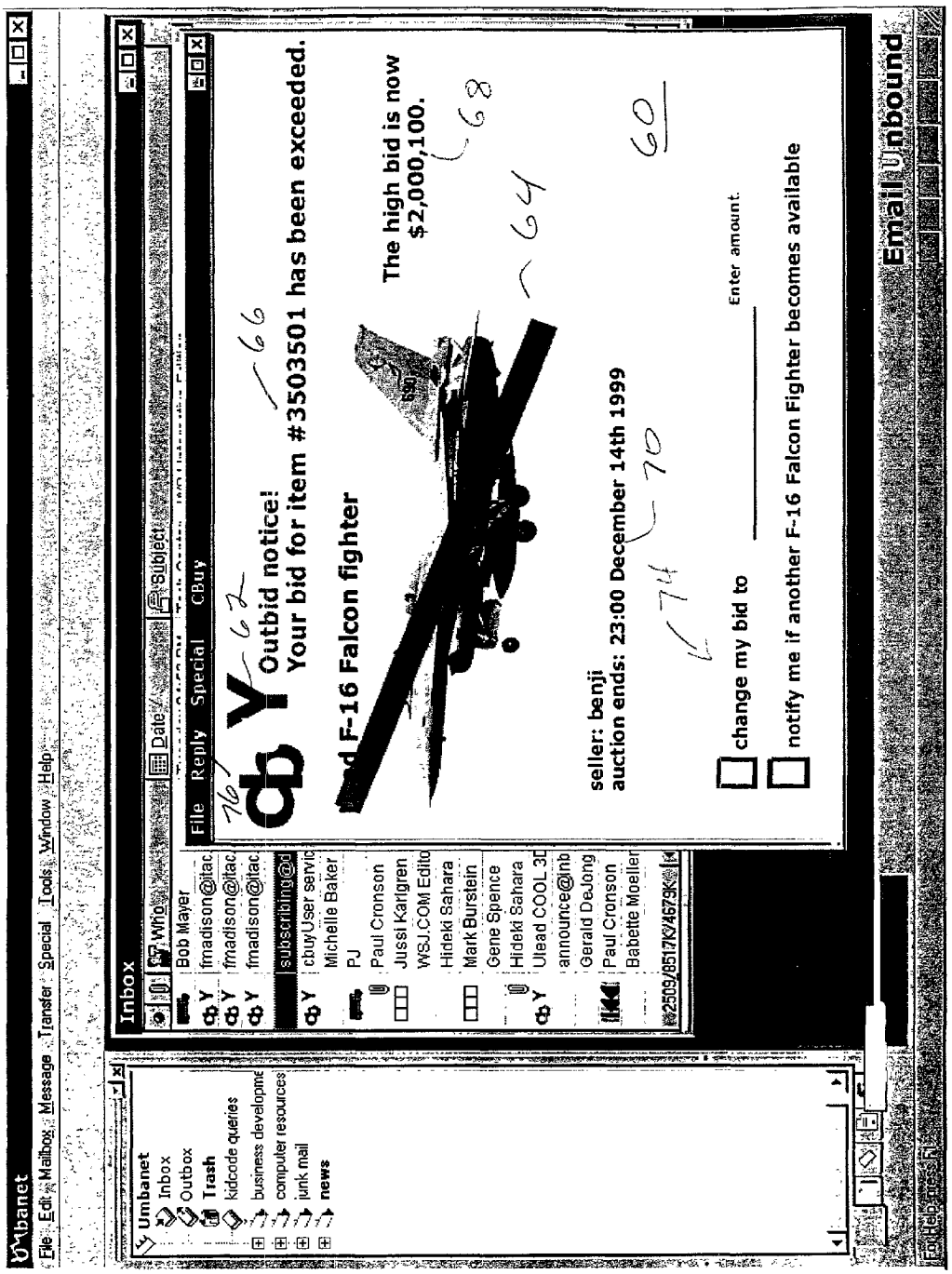
FIG. 6 is a screen shot of an interactive template created by an auctioneer authoring component and displayed by a bidder/seller authoring/reading component displayed in the bidder role.
Figure 7:
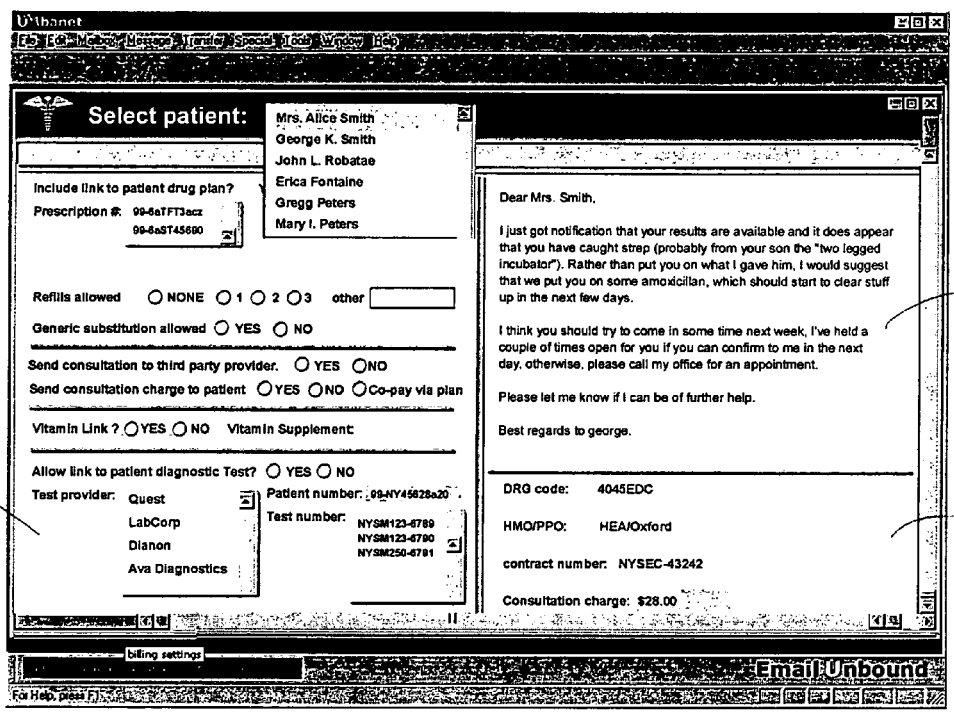
FIG. 7 is a screen shot of a doctor reading/authoring component.
Figure 8:
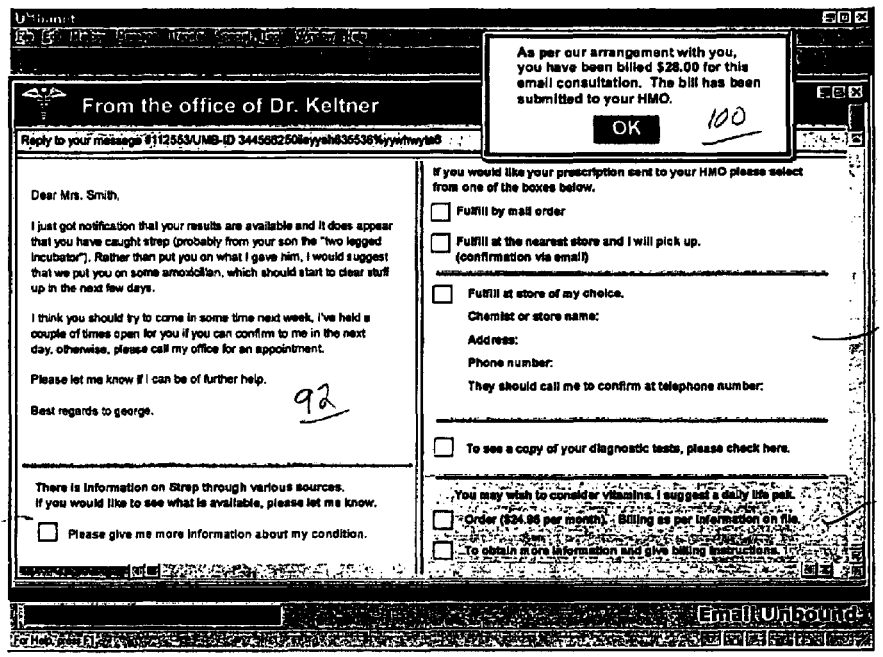
FIG. 8 is a screen shot of a patient reading/authoring component.

The main email client 10 also includes a GUI 28 for user control of those functions that are directly associated with storage, display, and transfer of electronic mail messages and mailboxes. In particular, the main email client interface includes buttons and/or menu items that allow a user to send a message, reply to a message, open a message or a mailbox, delete/trash messages or mailboxes, save a message to an alternative mailbox, and print a message. According to the presently preferred embodiment, the main email client user interface operates simultaneously with the user interface of an authoring/reading component in the sense that both are active on the screen at the same time and present the "look and feel" of a single application. For example, FIGS. 6-8 show authoring reading components for an auction bidder, a doctor, and a patient respectively. As will be explained in more detail below with reference to FIGS. 6-8, each of the authoring/reading components has its own interface which permits the user to interact with the component in a manner particular to the component. As seen in FIGS. 6-8 the authoring/reading component interface is generally provided in a separate menubar or integrated within the space of a window. Nevertheless, the main mail client interface is still provided, for example at the main menubar where the File, Edit, Message, Transfer . . . functions are always accessible. When a user interacts with the authoring/reading component interface, the authoring/reading component handles the user event. However, when a user selects a function from the main email client, the main email client intercepts and handles the event. Generally, if a message handler component is open, a user event in the main program will require an API call to the message handler component 1 in order to fully execute the user invoked action. If, for example, the user selects the "send" function, the main program intercepts the send request and makes a call to the API function msh_sendMessage (described in more detail below) in the active message handing component. The msh_sendMessage function passes a valid message body back to the main program or, if for example, a valid message body has not yet been defined, passes a FAIL code back to the main program.

The user administration module 30 provides functionality for management of user information such as the user's POP mail account, SNMP server, etc. In the case of a multi-user mail client (e.g. the KIDCODE® client described in previously incorporated Ser. No. 09/209,162), the user administration module includes administrative functions and a user interface to add and modify information for more than one user. The module maintains a data structure consisting of all relevant user information for each user in the system. The module also manages files that are required for permanent storage of user information, if necessary.

The component installer module 32 handles the installation of installable components (authoring/reading, mailbox, etc.) and maintains a data structure of component information for each installable component. When a new message handling component is installed into the mail client, the following information is made accessible to the main mail client via the component installer: MIME type of message handled by the component, component name and type, location and file name of program executable code for the component, location(s) of icon image data for the component, and description of the resources that need to be installed into the main client, e.g. buttons, menu items etc.

The implementation of the component installer is dependent upon the programming environment within which the system is built and meant to operate. In order for installable components to operate properly, it is necessary for the main client program to be able to execute the new component's program code and make function calls to that code. It is not sufficient to execute the code as a completely separate program module because function calls and data must be passed between the main program and the component. For example, in a Windows environment, an installable component might be made up of one or more DLL's (dynamic link libraries) and one or more resource or ini files. The email clients described in the previously incorporated parent applications were implemented with MACROMEDIA DIRECTOR using protected movies and an MIAW (movie in a window) invocation architecture. A Java implementation would use loadable Java classes to implement installable components.

The component installer should also be capable of editing data structures in the main program that manage the display of relevant user interface controls. For example, the component installer for the KIDCODE® client (described in previously incorporated Ser. No. 09/209,162) adds a new button with the component icon to the main screen as well as making an icon available to the mailbox display component. It is also generally desirable to add entries for the new component to menus in the main client program.

An important part of the design of the component installer is a specification document that describes the format and type of information that must be provided by each installable component in order to have that information installed into the main client program.

The special services module 34 allows the UMBANET mail client to communicate with UMBANET servers on the Internet in order to provide specialized services such as component downloads, message tracking and accounting, recipient mail capability verification, PKI security and certification, etc. The UMBANET client uses TCP/IP and a proprietary protocol to communicate with UMBANET servers. Once a TCP/IP connection has been established with an UMBANET server, the client registers with the server. Thereafter, the client and server exchange information using the UMBANET protocol.

As mentioned above, the mailbox and the authoring/reading components are preferably "installable". However, it is possible to create an email client having most of the desired functionality of the invention with fixed components hard coded. In either case, the invention prescribes that mailbox components are used to display, edit, and browse mailboxes. Different kinds of users and different types of messaging applications (e.g. fax, traditional email, internet voice) may require very different displays and functionality from a traditional mailbox viewer/editor. Installable mailbox components make it possible to upgrade, select from multiple viewing formats, utilize different mailbox viewer/editors for different users, and in general increase the range of functionality that can be achieved within one basic messaging application program.

The message authoring/display (message handler) components make it possible to handle an unlimited number of message types. Each message handler component is designed to deal with a specific MIME type of message. The MIME data standard has been designed so that application developers can define new MIME types as needed by labeling these with the "x-"<string> prefix. A message handler component can be any program that defines a message MIME type of data that it handles, implements the callback API functions described below, and matches the requirements imposed by the component installer module. API callback functions allow the main email client to obtain information about the message handlers and allow the message handlers to respond to standard mail commands such as Send or Reply, that have been issued by a user through the main email interface.

As described in more detail below with reference to FIGS. 3-8, some of the types of message handler components contemplated by the present invention are those which can be thought of as creating "roles" among senders and recipients of mail messages. As will be further elaborated, either the message handler or the message created by it can establish the "roles" of the recipients and the authors such that recipients and authors are each permitted to interact with the message in certain different predefined ways.

Before describing the specific message handlers of the instant invention, it is useful to first fully describe the preferred APIs used to implement the main email component, the mailbox components, and the message handlers.

Main Email API Functions

These functions are called by the installable components to access services provided in the main email program.

emh_getUserMailbox (dt_MailBoxName)

This returns a mailbox data structure for the current user and mailbox name. This function is normally called by a mailbox handling component. Mailbox handling components may use temporary files to hold mailbox contents but they preferably never access the users mailbox files. All access to these files should be obtained through the main email program. The input to this function is (dt_MailBoxName) and the output is dt_MailboxData.

emh_getUserData (dt_UserName)

This returns a data structure with user information (in a multi-user client). The main email program maintains all user information and handles user administration functions. The main program also communicates with external mail servers which may contain other user information. The input to this function is (dt_UserName) and the output is dt_UserData.

emh_continue

This function is used by installable components to explicitly pass control back to the main email program. This function is necessary for the present implementation which uses MACROMEDIA DIRECTOR LINGO code. It is not a requirement for alternative implementations. The function has the argument (dt_ComponentType).

emh_killComponent

This function is used by an installable component to inform the main email program that it is preparing to terminate. This allows the main program to free any memory and/or data structures that have been allocated to the component.

emh_passMessage

This function is used primarily by mailbox components to pass a message to the main program so that it can be displayed by the appropriate message handling component. The main program takes the message arguments (em_MailData) or (em_MessageAction). The former looks up the Mimetype of the message, and invokes the appropriate message handler to display the message. The latter is used with #open, #print, #send, . . . etc.

emh_getMessage

This function returns the message (em_MailData) with Number MessageNumber from the MailboxName of the current user. It can be used by installable components to retrieve specific messages from the user's mailboxes. If this is called with the messageNumber set to 0, the main email assumes the typeOrBoxName argument is a mimetype and returns a new message structure. Message handling components should call emh_getMessage with the number set to 0 and the mimetype whenever a new message is started. Normally this should be done whenever an active message is trashed.

emh_getRegisteredUsers

This returns a list of usernames (dt_RegisteredUsers) for the users that are registered with the email client, i.e. that have been added as users by the user administration part of the main email program. This is the same list of users that appears in the logon listbox when the program is started up. It may be used by installable components to create listboxes for filling address fields in messages or for checking whether a particular address is external to the system. This function may be used with an argument that specifies a MIME type. When so used, the function will return a list of users who are authorized to receive (or capable of displaying) messages of the specified MIME type. The indications of the authorizations or capabilities of users may be stored on a local server, on a remote server (via the Internet), or may be stored locally on a user's computer.

emh_sendMessage

The main email client sends a message with the argument (em_MailData) by either forwarding it to an external mail server or, if it is a registered email client user, writing the message to the user's incoming mail mailbox.

emh_saveMessage

The main email client saves a message with the argument (em_MailData) for the currently logged on user by writing the message to the user's "notes in progress" mail mailbox.

emh_disableButton

It is recommended that this function be used carefully. Normally, the main email program controls the state of all the buttons available to users to access message handling of the main program. This function can be used to request that the main email program disable the button specified by the argument, ButtonName. If the button is disabled, whether it was already disabled or is disabled as a result of this function call, this function will return TRUE, otherwise it will return FALSE. The calling component should check whether the function call succeeded and proceed accordingly. The ButtonNames are #reply, #send, #print, #trash, etc.

emh_enableButton

It is recommended that this function be used carefully. Normally, the main email program controls the state of all the buttons available to users to access message handling of the main program. This function can be used to request that the main email program enable the button specified by the argument, ButtonName. If the button is enabled, whether it was already disabled or is disabled as a result of THIS function call, this function will return TRUE, otherwise it will return FALSE. The calling component should check whether the function call succeeded and proceed accordingly.

API Functions for Use with all Component Types emc_startMeUp

This function is used by the main email program to tell an installable component to start. This function will execute prior to initialization of the component's data structures, which should only be initialized after the component receives the emc_initWindow call from the main email program. This function is necessary for the MACROMEDIA DIRECTOR LINGO code implementation and may not be needed for other implementations.

emc_initWindow

This function is used by the main email program to tell an installable component to initialize its data structures and prepare its graphical display. The component is passed the username of the current user. If the component requires additional user information in order to initialize, it can call emh_getUserInfo within its implementation of this function.

emc_closeWindow

This function is used by the main email program to tell an installable component to free all memory that it has used, close its window, and shut down.

emc_getComponentInfo

This function is used by the main email program to get required information such as componentName, componentID, etc. from an installable component. This function should not be called until the component window is fully open.

API Functions for Use with Mailbox Handler Components mbx_getMessageNumbers

This function is used by the main email program to get the message number of the currently selected message in the mailbox browser. If no message is selected, the list should be empty.

mbx_getMessage

This function is used by the main email program to get the message data structure of the message with em_MessageNumber from the mailbox currently displayed in the mailbox browser. If the function fails, e.g. if there is no message with the given message number, the function returns an empty list.

mbx_trashMessages

This function is used by the main email program to tell the mailbox component that it has received a trash event (e.g. user pressed trash button). The component should identify which messages have been indicated by the user and return these messages in a list data structure. If no messages have been indicated by the user or if the component wishes to cancel the operation it should return an empty list. When it receives this call, normally the mailbox component will update its display and its data structures to delete messages that have been indicated by the user.

mbx_openMailbox

This function is used by the main email program to tell the mailbox component to display the mailbox passed in the argument (dt_Mailbox).

Functions for Use with Message Handler Components msh_sendMessage

This function is used by the main email program to tell a message handling component to pass back a fully completed message data structure so that it can be sent to the recipient specified in the message's address field. The message handling component should update its display as appropriate for a message that has been sent. It should also change its state to display mode because a message that has already been sent should not be editable. If the function fails, e.g. if a fully completed message cannot be constructed (for example, if the user has not specified a message recipient), the function returns an empty list.

The message handling component will normally control all dialogs with a user that pertain to a message under construction. For example, to alert the user that a message recipient must be specified. However, if the message handling component fails to pass back a properly formatted, completed message data structure, (or an empty list acknowledging failure), the main email program will detect the error and alert the user about the field or fields that have not been specified.

msh_openMessage

This function is used by the main email program to pass a message data structure to a message handling component so that it can be displayed. The message handling component should display the message in the specified mode (e.g. either #author or #display). If the em_Mode argument is #display the message should not be editable. Otherwise the message should be opened so that it can be edited. If the function fails, e.g. if an error is detected in the message body, the message handler returns FALSE, otherwise the message handler returns TRUE.

msh_replyMessage

This message is used by the main email program to inform a message handling component to display the currently active message for editing as a reply. In order to reply, the message handing component will generally create a new message with the mode set to #author. If the function fails, e.g. if an error is detected in the message body, the message handler returns FALSE, otherwise the message handler returns the messageBody which may have been modified.

msh_clearMessage

This function is used by the main email program to inform a message handling component that the current message should be cleared from the display and from the message handling component's data structures. This function is used, for example, when the user indicates they want to trash the current message by clicking on the "trash" button in the main email program GUI. If the function fails, the message handler returns FALSE. Otherwise the message handler returns TRUE.

msh_saveMessage

This function is invoked when the main email program receives a save event, e.g. the user presses the "Save" button. The message handler should pass the messageBody back to the main email program to be saved. In general, the message handler should maintain its state when this function is called because the user may want to continue editing the message.

msh_printMessage

This function is used by the main email program to inform a message handling component that a message should be printed. This function is used, for example, when the user indicates they want to print the current message by clicking on the "print" button in the main email program GUI. When the argument, em_mailData, is an empty list, the message handler component should print the currently active message. Otherwise the message handler component should print the message argument. Normally, if the message handler component has been fully initialized and is displayed in a window, the main email program will call this function with an empty list for an argument. The function may also be used by the main email program to have a message handler print a message even though the message handler component has not been fully initialized and displayed in a window. For example, this will occur if an active mailbox component receives a print request from the main email program for a message that has been selected in the mailbox browser. In this case, the main email program will send a request to the appropriate message handler component to print the message without fully starting it up and initializing its window. Therefore the message handler should implement the msh_printMessage function so that the following sequence of function calls succeeds emc_startMeUp, msh_printMessage(message). If the function fails, the message handler returns FALSE. Otherwise the message handler returns TRUE.

msh_trashMessage

This function is used by the main email program to tell a message handler component that it has received a trash event (e.g. user pressed trash button). The component should do whatever is appropriate and return its currently open message data structure. A component may want to display a dialog box to verify the trash operation before proceeding. (e.g. emh_alertUserToTrash) If the component wishes to cancel the operation, it should return an empty list. Normally a message handling component will update its display and its data structures to clear the trashed message from its display.

From the foregoing, those skilled in the art will appreciate that message handling components may be created for different user roles and/or messages may be assigned certain role information which controls how the recipient(s) of the message interacts with the message. Moreover, certain message handling components can provide different levels of authoring and different levels of readership based on "roles."

Figure 3:
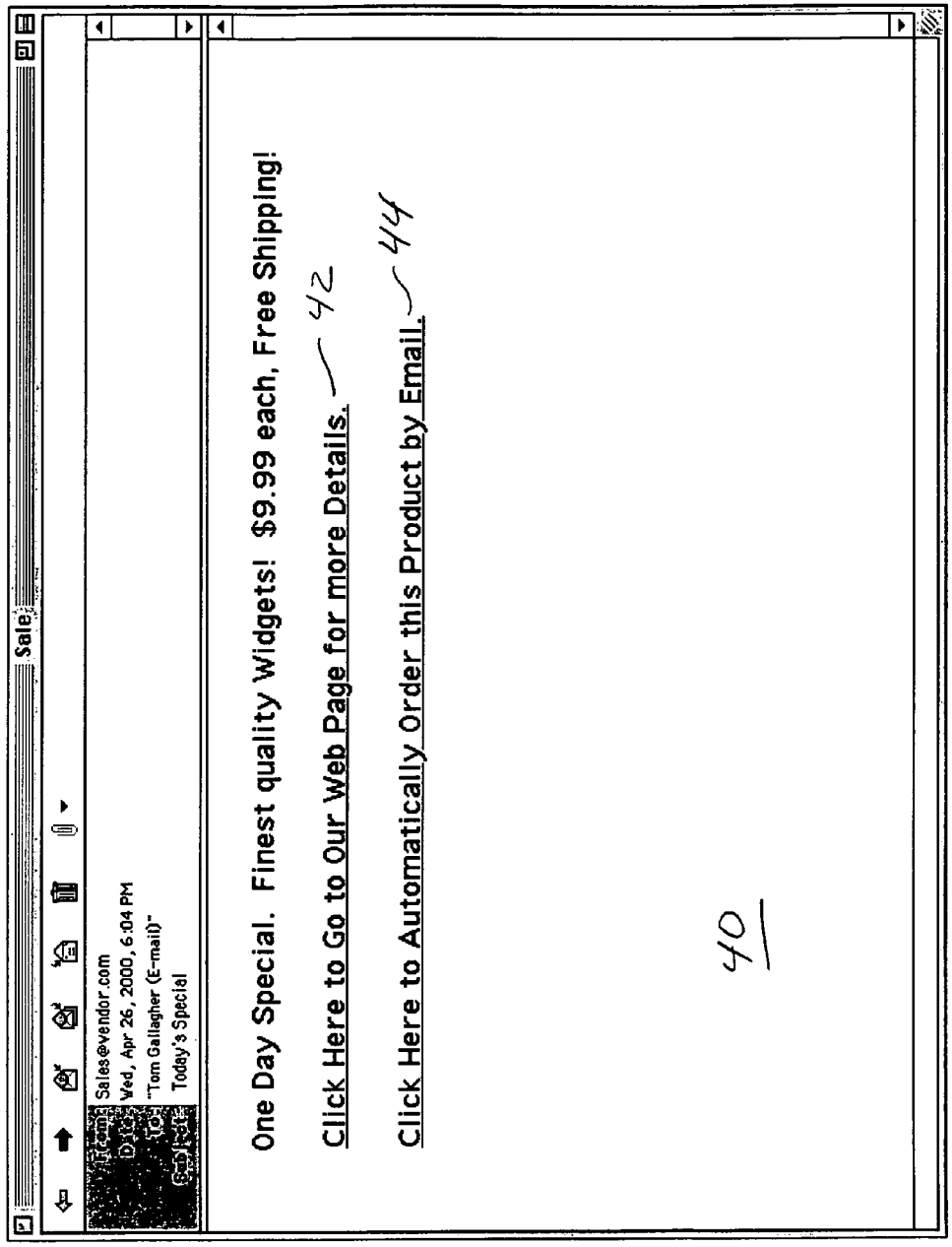
FIG. 3 is a screen shot of an email message created with a vendor authoring component and displayed by a generic authoring/reading component which can control the generation of new messages for other authoring/reading components.
Figure 4:
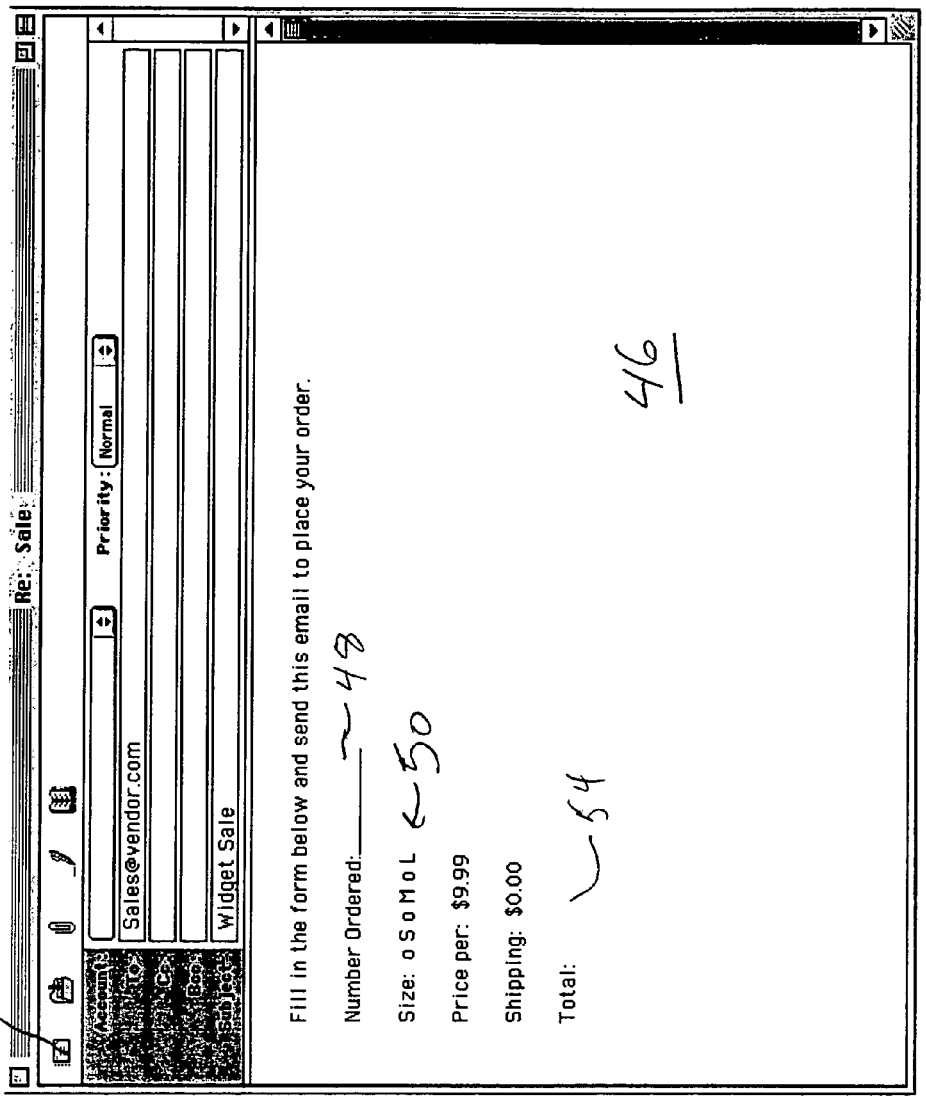
FIG. 4 is a screen shot of an uncompleted email message template generated by a customer reading/authoring component in response to the email message shown in FIG. 3.

Turning now to FIGS. 3-6, one implementation of a message handling component is that of a "customer" component (or a reading/authoring component which is responsive to a "customer message role). FIG. 3 illustrates an email message 40 which was created by a "vendor" component (or an authoring/reading component in a "vendor" role). FIG. 3 shows the message as it appears on the recipient's computer screen. As shown the message appears to be a simple plain text email message with a hot link 42 to the vendor's web page (the underlined sentence "Click here to Go to Our Web Page for more Details."). However, the second hot link 44 in this message (the sentence "Click here to Automatically Order the Product by Email") invokes special functionality of the reading/authoring component installed in the recipient's email program. When the user clicks on this second hotlink, the "customer" message handling component causes a new outgoing email message 46 to be created as shown in FIG. 4.

Figure 5:
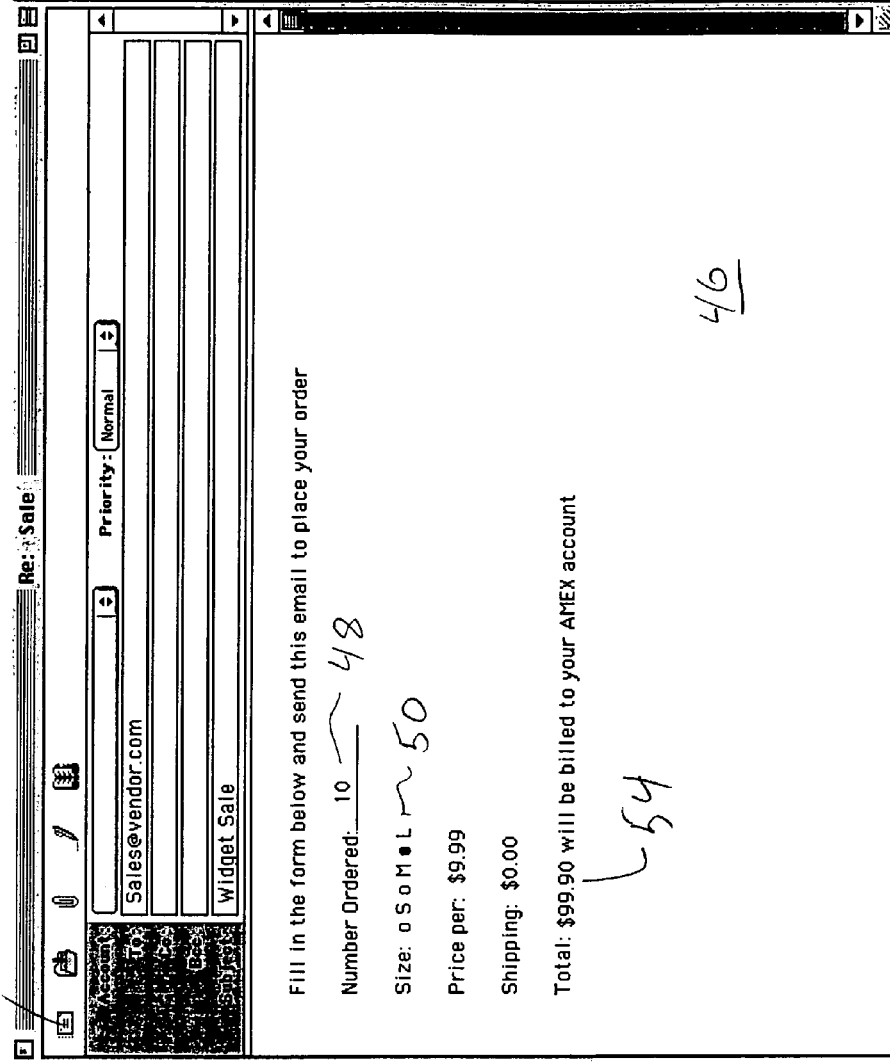
FIG. 5 is a screen shot of the completed template of FIG. 4.

As shown in FIG. 4, the new mail message is pre-addressed and the body contains information relating to the order which will be placed when the new message is sent. The body of the message is actually a template which was created from information contained (though hidden from display) in the email message 40 received from the vendor. This information was not displayed in the original message shown in FIG. 3, but was made known to the message handling component for use in creating the template 46 shown in FIG. 4 if the user clicked on the second hot link 44 in FIG. 3. The customer role assigned to this outgoing email message 46 allows the user to make only limited additions to this template. Specifically, the user may enter a number of items in the blank 48 and a choose a size using the "radio buttons" 50, then click on the send mail icon 52. This template is interactive and controlled by the message handling component so that as soon as the user selects a number to order, the purchase price is displayed in the field 54 as shown in FIG. 5. In order to minimize the amount of input required of the customer, the purchase price is preferably charged to an account already set-up with the vendor. This mode of operation also maximizes the security of the transaction.

As mentioned above, the user can click on the send mail icon 52 once the form is filled in. Preferably, the send mail icon 52 will remain "grayed out" until the user completes all of the information required by the form. If the user changes his/her mind about placing the order, s/he may simply close this window without sending the message. If the user clicks on the send icon 52, the mail is sent back to the vendor, preferable with an assigned role of "order fulfillment", for example. The message may also be preferably addressed to an automatic mail handler which will automatically extract information from the order and from the customer database and process the order.

FIG. 3 shows what looks like a standard HTML message but is used to open a customer reading/authoring component displayed in FIGS. 4 and 5. The screen shot of FIG. 3 doesn't show what the vendor authoring component would look like since it is displayed from the point of view of the customer. On the other hand, the message can be used to start a new message in the "customer" component. There are different scenarios that could be depicted by FIGS. 3-5.

According to the first scenario, FIG. 3 shows a message displayed in a customer component with the "customer" role. The customer clicks on the "Click here to Automatically order . . . ," and the customer component starts a new message that is assigned the role "vendor" (i.e. it will be received by a participant in the vendor role). The new message with the "vendor" role is displayed in the customer component is shown in FIG. 4. This is an interpretation that matches closely to the operation of the code included in the parent application. However, in the original code, the invocation of the new message is normally done by hitting the "reply" button in the main interface rather than a field displayed on the incoming message.

This functionality is useful if it is necessary for a message author (e.g. a vendor) to control the assignment of role information associated with various types of replies on an individualized basis. For example, if it wanted certain types of customers to have access to the online customer service and wanted to encode this in the message body itself. In this case, some customers would receive a message looking similar to the one displayed in FIG. 3 with an additional line that says "Click here to request customer support" in which case a new message with a role assigned to be "SalesInfo" would be created in the Sales authoring/reading component.

According to the second scenario FIG. 3 shows a message displayed in a "controller" component that is capable of responding to an input pair (message data+user action) by opening new messages in other components. When the customer clicks on the "Click here to automatically order . . . ," the "controller" component opens a new message in author mode (perhaps tagged with the "customer" role) in the "customer" component. This scenario could be implemented by sending an HTML-like message with a message MIME type set up to identify the controller component, e.g. "x-ControllerMsg" whose body consists of a set of data pairs (display_string/associated component to open/data parameters for component). For example, the screen shown in FIG. 3 could be generated by a message that had a "Content-Type=x-ControllerMsg" and a message body that consists of:

("one Day Special . . . /nil/nil)

("Click here to go to our Web Page for more details." /text/HTML/"http://www.sales.com")

("Click Here to Automatically Order this Product by Email" /x-Sales/Customer/"PID 121121")

Existing mail clients are almost capable of implementing this sort of behavior using HTML and Javascripts. If an existing mail client were modified to be able to run Javascripts, the message displayed in FIG. 3 could consist of HTML and Javascripts. When the user clicks on the "Click here to automatically . . . ." A Javascript could run that opens the customer component with a new message with the vendor role (as shown in FIG. 4). However, as mentioned above, this type of implementation would open the mail clinet user to malicious Javascripts. According to the preferred embodiment of the invention, no executable code is contained in a message, only tags which are read by the authoring/reading component.

FIG. 6 shows another similar example of a message handling component/role is used in e-commerce. FIG. 6 shows an email message 60 which was generated by an "auctioneer" component (or an authoring/reading component in auctioneer mode). FIG. 6 shows the message as it appears on the computer screen of a "bidder". This message contains several graphic components 62, 64, three text message fields 66, 68, 70, and an input template 74. The message 60 is a combination incoming/outgoing template. The bidder fills in the appropriate parts of the template 74 and clicks on the "reply" button 76. The bidder's authoring/reading component composes an appropriate message to the auctioneer and sends it automatically and transparently. The user will see the message 60 disappear and preferably see a dialog box or window notice saying "Message Sent" or the like.

Figure 6A:
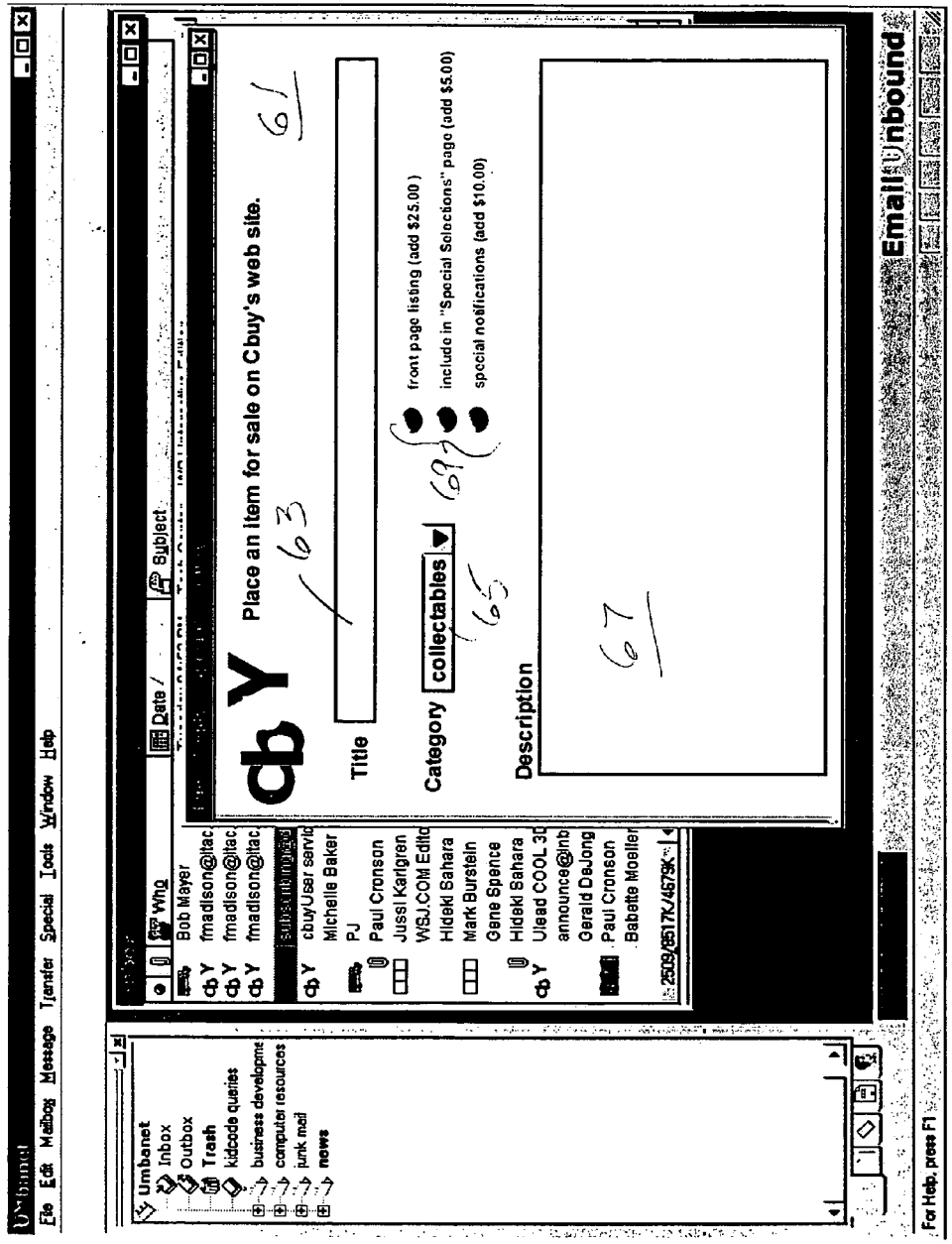
FIG. 6a is a screen shot of an interactive template created by an auctioneer authoring component and displayed by a bidder/seller authoring/reading component displayed in the seller role.

As mentioned throughout above, the concept of role may be associated with a particular component or with a message created by the component. In the auction example, it is desirable that the non-auctioneer component have at least two modes of operation, one being the role of bidder and the other being the role of seller. The bidder role is illustrated with reference to FIG. 6 described above. The seller role is illustrated with reference to FIG. 6a which shows a message template 61 which is created when the user chooses to post a for sale message. The template 61 includes a title field 63, a category field 65, a description field 67 and an option checklist 69.

According to a presently preferred embodiment, the concept of role is associated with the message and authoring/reading components are capable of creating and reading messages having different roles. In the KidKode® embodiment of the invention, the role of the message is contained within the body of the message. According to other embodiments, the role of the message is encoded in the MIME type, subtype, a parameter in the "Content_Type" header, or in the subject header. The processing of a message with a specified role may be carried out either by an authoring/reading component designed specifically to handle messages with the specified role or by an authoring/reading component that is built to handle all messages of a specified MIME type. When the authoring/reading component handles all messages of a given MIME type it includes within it the logic necessary to process messages with different roles differently.

As mentioned above, in the KidCode® embodiment, the message role is encoded in the message body and is handled entirely by the authoring/reading components. This has advantages over an alternative that records the message role in a message header field because the mail email client can be independent of any knowledge of roles and does not need to be encumbered with role handling logic that is best left to component designers. However, this places a restriction on the design of authoring/reading components. If role information is embedded in the message body, it is not advisable to allow the creation of authoring/reading components specialized to handle certain roles. To do so would require that the main mail client software be capable of parsing the message body in order to find the role information and, thereby invoke the proper authoring/reading component for a given message. Good software design principals require a strict separation between the data available to the main mail client and data that is processed exclusively by authoring/reading components. Maintaining this separation is very important to ensure integrity of the API which allows independent software developers to build authoring/reading components that can be guaranteed to work properly with a main email client program.

Nevertheless, there are many types of transactions in which each participant in an email exchange acts in a single role. For example, in the Doctor/Patient application described below, the individual who is the patient normally does not take on the Doctor role. In this case, it is both more secure and more efficient to construct separate authoring/reading components to handle Doctor or Patient messages. It is also desirable to recognize that these are two sides of the same transaction and encode all messages associated with the transaction with the same MIME type.

A solution that enables both the development of authoring/reading components specialized to handle particular roles and guarantees data separation as described above is to encode role information as a subtype of the MIME type in the "Content-type" header field. Using this method, the main email client would properly invoke the correct authoring/reading component in the case that an independent authoring/reading component has been constructed for handling a specified message role. Another alternative is to encode role information in the parameter that may be optionally included in the "Content-type" header as defined by the MIME standard. In this case, the main email client maintains data separation with respect to the message body but is required to parse the Content-Type parameter. The additional complexity necessary in the main mail client software causes this to be an inferior solution.

FIGS. 7 and 8 illustrate authoring/reading components having the roles of "doctor" and "patient". FIG. 7 illustrates a message template 80 for use by a doctor. The message template is divided into three main parts 82, 84, 86. The first part 82 presents the doctor with pop up menus for selecting, for example, patient name, prescription number, test provider, test number, etc. Radio buttons are also used to enter information about prescription refills, generic substitution, etc. The second part 84 is a text editor window where the doctor may compose a personal message to the patient. The third part 86 is a text entry template HMO information, consultation charge, etc. After the doctor fills out the message template 80 and sends it, the authoring/reading component prepares a message to the patient and a message to the HMO. Optionally, the authoring/reading component could also prepare messages to a pharmacy, to a test lab, etc.

FIG. 8 illustrates the message 90 received by the patient as a result of the doctor filling in the template 80 (FIG. 7). The message 90 presents the role of patient and organizes information in a manner useful to the patient. The message 90 includes a text field 92 which displays the text message composed by the doctor and entered into the text field 84 in FIG. 7 and several check box fields 94, 96, 98. Field 94 allows the patient to request information about a medical condition. Field 96 allows the patient to select certain parameters regarding the filling of a prescription and to request a copy of diagnostic test results. Field 98 allows the patient to purchase and obtain information about vitamins. FIG. 8 also illustrates a pop-up dialog box 100 which alerts that patient regarding to the billing information entered by the doctor in field 86 of FIG. 7. When the patient selects parameters regarding the filling of a prescription, the patient component automatically sends email to the pharmacy with only the information needed by the pharmacy to fill the prescription.

From the foregoing, those skilled in the art will appreciate that the concept of "roles" as implemented herein may be expanded to a number of different useful applications of interactive email. The roles described and illustrated above include customer, vendor, database, doctor, and patient. Previously incorporated parent application Ser. No. 09/209,162 disclosed several examples of teacher and student roles. Those skilled in the art will appreciate that the principles describe herein can be applied to roles such as service provider, technical support, attorney, client, and organization members having different security clearances. Service provider and technical support will present templates requesting information needed to diagnose a problem. Reply mail with data fill-in can be parsed by an artificially intelligent mail reader and tentative diagnoses sent by email to a human representative. The attorney and client roles may be implemented in a manner similar to the doctor and patient roles. The roles of organization members have different security clearances can be implemented in a manner whereby a message created by someone with the highest security clearance is classified in different ways so that only those with the proper clearance can read it. For example, it is possible to create a message where some parts of the message are highly classified and other parts of the message are given lower classifications. Readers with high security clearance will be able to read all or most of the message. Readers with low clearance will only be able to read parts of the message.

As stated above, normally the role information associated with each message is assigned to the message when it is created or when it is sent. A role can often be automatically assigned to a message by the authoring/reading component used to author the message. The role given to a message may be based on many factors including the state of a previous message (or sequence of messages), information selected by a message author, and information associated with the message recipient and/or the message author. In the KidKode® embodiment, the authoring/reading components built for children's educational games automatically assign a role to a message on the basis of the state of a previous message.

Figure 9:
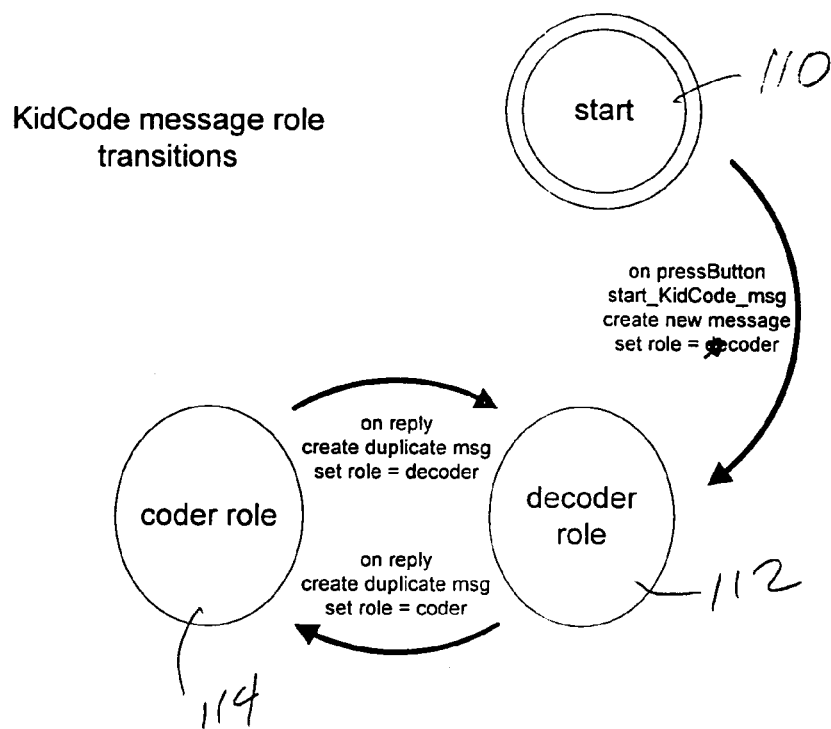
FIG. 9 is a state diagram illustrating how roles are automatically assigned.

FIG. 9 shows the state diagram used to determine how roles are automatically assigned to KidCode® messages. In a preferred embodiment of the KidCode® coder/decoder games, when a user starts a new message at 110 by pressing the message authoring button in the main client program, the message is tagged as a "new" message and treated as a "coder" message. When the message is sent, the message role is set to "decoder" at 112 because the message recipient will play the role of decoder of the puzzle. When the decoder sends the reply to the message the role of the outgoing message is set to "coder" at 114. When the coder participant receives that reply from the decoder, the fact that the message is tagged with the "coder" role causes appropriate "coder" tools to be made available by the authoring component. As is shown in FIG. 9, each time a reply message is created a copy of the original message is made and the message role is set to the opposite role.

FIG. 10 elaborates on the manner in which messages are displayed by the KidCode® Rebus and Grid message handling components. Whereas FIG. 9 describes transitions undergone by a message (or message descendants), FIG. 10 shows the transitions of the state of an authoring/reading component. This Figure provides a more complete picture of how an authoring/reading component can use the message role and the message display mode (a property of the authoring/reading component that normally takes one of the two values, "display" or "author") to determine how a message should be displayed and what tools are available to the message author or reader. On start 116, the component has three options. One option is to create a new message in the coder role (component author mode) 118. Another option is to open a message in the decoder role (component display mode) 120 in order to view a puzzle created by another. Still another option is to open a message in the coder role (component display mode) 122. This option would be used to view a response by a decoder to a coded message created by the current user. If the user chooses to reply to this message, the message role is changed to decoder (component author mode) 124.

The above illustration illustrates an important distinction to note regarding the interaction of the message mode and the message role. For many types of interactions it is desirable to control the information that is seen by the user depending upon the role that the user has in a given transaction or series of exchanges. For example, messages that have already been sent and reside in the outbox are read only messages (i.e. always opened with the mode set to "display"). In the case of an authoring component such as the KidCode® Rebus or Grid, in which the role of a sent message is in an incorrect state for the message author (i.e. a decoder's message that has been sent has the "coder" role), a "display" mode message must be viewed as having a different role than it actually carries. If a Rebus decoder were to see his reply message after it has been sent with a "coder" role, he would be able to view the answers to the puzzle in the messages in his outbox. The logic to handle the various interactions between message modes and message roles are included in the authoring/reading component. In this way the main email component is separated from all aspects of message roles which are properly the domain of an particular messaging application.

There have been described and illustrated herein several embodiments of electronic mail software with modular integrated authoring/reading software components including methods and apparatus for controlling the interactivity between mail authors and recipients. While particular embodiments of the invention have been described, it is not intended that the invention be limited thereto, as it is intended that the invention be as broad in scope as the art will allow and that the specification be read likewise. Thus, while particular APIs have been disclosed, it will be appreciated that other APIs could be utilized provided that the basic functionality described herein is maintained. Also, while "installable" components have been discussed in detail, it will be recognized that permanently installed components could be used with similar results obtained, less the ability to upgrade functionality in an easy manner. Moreover, while particular configurations have been disclosed in reference to the relationship between the main email client, the message handlers, and the mailbox handlers, it will be appreciated that other configurations could be used as well provided that the basic functionality of the invention is maintained. It will therefore be appreciated by those skilled in the art that yet other modifications could be made to the provided invention without deviating from its spirit and scope as so claimed.

The invention claimed is:

1. An electronic mail client system, comprising:
    a) a mail handling component for sending and receiving electronic mail; and
    b) an authoring/reading component for creating electronic mail messages and for reading electronic mail messages, said authoring/reading component having at least two modes of authoring,
        said modes being selectable by said authoring/reading component when creating an electronic mail message, wherein
        one mode causes the electronic mail message to be displayed with all of the information in the message visible when read by the recipient's authoring/reading component and another mode causes the electronic mail message to be displayed with only a subset of the information in the message visible when read by another recipient's authoring/reading component.

2. An electronic mail client system according to claim 1, wherein:
    said two modes are selected from the group consisting of customer and vendor, teacher and student, auctioneer and bidder, and doctor and patient.

3. An electronic mail client system according to claim 1, wherein:
    the mode of a message is encoded in the message and determined by the authoring/reading component when the message is read.

4. An electronic mail client system according to claim 3, wherein:
    the mode of a message is encoded as a MIME.

5. An electronic mail client system according to claim 1, wherein:
a message created in a first of said two modes allows a recipient of the message to use a first set of tools to respond to the message, and
a message created in a second of said two modes allows a recipient of the message to use a second set of tools to respond to the message, said first set of tools and said second set of tools being different from each other.

6. An electronic mail client system according to claim 1, wherein:
a message created in a first of said two modes allows a recipient of the message to see the information contained in the message organized in the same way it appeared during creation of the message, and
a message created in a second of said two modes prevents a recipient of the message from seeing the information contained in the message organized in the same way it appeared during creation of the message, and only allows the recipient to see the information organized in a different way.

7. An electronic mail system, comprising:
a) a first electronic mail client having a first authoring/reading component for creating and reading electronic mail messages; and
b) a second electronic mail client having a second authoring/reading component for creating and reading electronic mail messages, wherein
said first authoring/reading component creates messages in a first mode and a second mode, and said second authoring/reading component reads messages in the second mode,
a message read in said second mode allows a recipient of the message to see only a subset of the information contained in the message, and
said message read in said first mode allows another recipient to see all information in the message.

8. An electronic mail system according to claim 7, wherein:
said first and second modes are selected from the group consisting of customer and vendor, teacher and student, auctioneer and bidder, and doctor and patient.

9. An electronic mail system according to claim 7, wherein:
the mode of displaying a message is encoded in the message by the first authoring/reading component and determined by the second authoring/reading component when the message is read.

10. An electronic mail system according to claim 7, wherein:
a message viewed in said first mode allows a viewer of the message to see the information contained in the message organized one way, and
a message viewed in said second mode only allows the recipient to see the information organized in a second way different from said first way.

11. An electronic mail client system, comprising:
a) a plurality of authoring/reading components for creating and viewing representations of information;
b) encoding means for automatically encoding representations created with said authoring/reading components into an Internet compatible email message; and
c) decoding means for automatically decoding said representations encoded by said encoding means, wherein
at least one of said authoring/reading components is responsive to a role mode encoded in an email message whereby said role mode determines how much information in said email message will be displayed.

12. An electronic mail client system according to claim 11, wherein:
said role modes are selected from the group consisting of customer and vendor, teacher and student, auctioneer and bidder, and doctor and patient.

13. An electronic mail client system according to claim 11, wherein:
a message encoded with a first role mode allows a recipient of the message to use a first set of tools to respond to the message, and
a message encoded with a second role mode allows a recipient of the message to use a second set of tools to respond to the message, said first set of tools and said second set of tools being different from each other.

14. An electronic mail client system according to claim 11, wherein:
a message encoded with a first role mode allows a recipient of the message to see all of the information contained in the message, and
a message encoded with a second role mode allows a recipient of the message to see a only subset of the information contained in the message.

15. An electronic mail client system according to claim 11, wherein:
a message encoded with a first role mode allows a recipient of the message to see the information contained in the message organized in the same way it appeared during creation of the message, and
a message encoded with a second role mode prevents a recipient of the message from seeing the information contained in the message organized in the same way it appeared during creation of the message, and only allows the recipient to see the information organized in a different way.

16. A method of corresponding by electronic mail, comprising:
a) creating a representation of information;
b) encoding the representation into an Internet-compatible email message;
c) sending the email message to an email client; and
d) decoding the email message at the email client, wherein
the email client is responsive to a role mode encoded in the email message whereby the role mode determines how much information in said email message will be displayed by the email client, and
the sender of the message controls the role mode.

17. A method according to claim 16, wherein:
the role mode is selected from the group consisting of customer and vendor, teacher and student, auctioneer and bidder, and doctor and patient.

18. A method according to claim 16, wherein:
the role mode of a message is encoded as a MIME.

19. A method according to claim 16, wherein:
the role mode determines what tools may be used by the email client to view the representation of information.

20. A method according to claim 19, wherein:
the role mode determines what tools may be used by the email client to respond to the message.

21. A method according to claim 16, wherein:
the role mode determines how much of the representation of information can be viewed by the email client.

* * * * *